M. A. MARQUETTE.
REINFORCEMENT FOR TIRE BEADS.
APPLICATION FILED APR. 9, 1919.
1,349,898.
Patented Aug. 17, 1920.
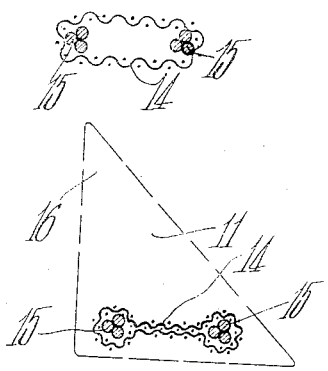
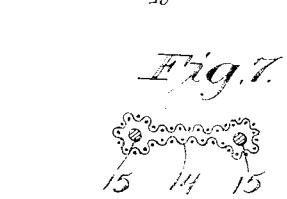
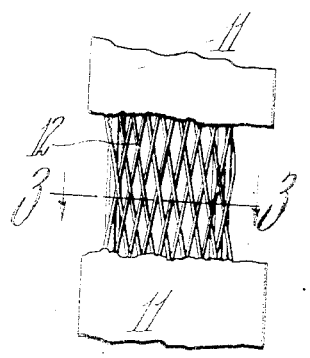
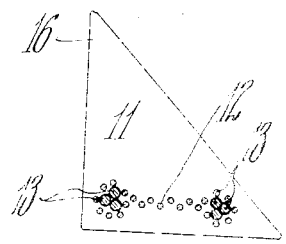
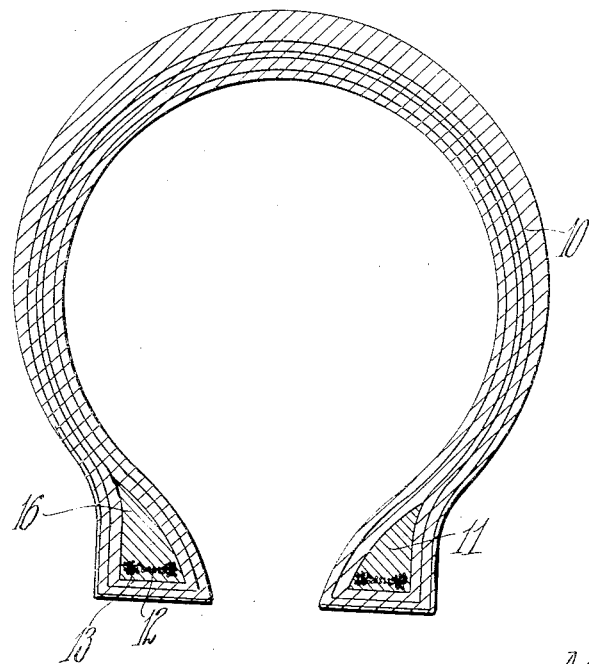
INVENTOR
Melvin A. Marquette
BY
Chapin & Neal
ATTORNEYS.

UNITED STATES PATENT OFFICE.

MELVON A. MARQUETTE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

REINFORCEMENT FOR TIRE-BEADS.

1,349,898.

Specification of Letters Patent.     Patented Aug. 17, 1920.

Application filed April 9, 1919. Serial No. 288,716.

*To all whom it may concern:*

Be it known that I, MELVON A. MARQUETTE, a citizen of the United States of America, residing at Springfield, in the county of Hampden and State of Massachusetts, have invented certain new and useful Improvements in Reinforcements for Tire-Beads, of which the following is a specification.

My invention relates to improvements in reinforcements for the beads of pneumatic tires.

It has for its object the provision of a firm bead for pneumatic tires; and in particular has for its object the improvements of beads of similar character by making the reinforcement of a type that can readily be located in position during the building up of the bead, thereby both reducing the cost of production and increasing the quality of the product.

The invention will be described with particular reference to the accompanying drawings, in which—

Figure 1 is a transverse section of a pneumatic tire casing, showing the improved bead in place, and diagrammatically showing the layers of fabric forming the tire.

Fig. 2 is a view of the inner circumference or bottom one of the beads, with a portion of the rubber and fabric cut away so as to expose the reinforcement;

Fig. 3 is a section of line 3—3 of Fig. 2, showing the bead filler in dotted outline;

Fig. 4 is a view similar to Fig. 3 showing a slightly different form of reinforcement;

Figs. 5 and 6 are diagrammatic details showing steps in the construction of a reinforcement such as is illustrated in Fig. 4 and Fig. 7 is a view similar to Fig. 6 showing a slightly different type of construction.

In Fig. 1 the body of the tire is represented by 10, and is built up of layers of rubber and fabric or cords in any one of the usual ways. At the base of the tire, this composite material encircles a more or less triangular bead filler 11 usually formed of fabric impregnated with rubber. To give considerable rigidity to this filler, it has been proposed to locate two spaced cables near the bottom or inner circumference of the filler, as is illustrated by the patent to Dowse No. 1,174,238, March 7, 1916. During the formation of the filler for beads of this type, difficulty is experienced in definitely locating the cables, it being almost impossible to keep the two cables in proper spaced relation both to each other and to the filler itself. It is a feature of my invention that the positioning of these cables in the filler is greatly facilitated. My invention also gives a more rigid anchoring than is attained by two unconnected spaced cables.

In the form of the invention illustrated in Figs. 2 and 3, the reinforcement is composed of a strip of fabric 12, preferably of woven wire, with one or more additional reinforcing members 13 woven into the selvages thereof. As shown, these additional members are of a slightly larger diameter than the wires forming the main part of the fabric, but this is not essential. The salient feature is the provision of enlargements or strengthened portions near the edges of the reinforcing strip, thus giving a solid base which will resist any tendency to overturn in either direction.

As the reinforcing strip is constructed as a unitary member and as it is substantially straight in a direction transverse to the bead, it is a simple proposition to properly position it during the construction of the bead filler, and the complexities incident to the use of two separate cables, as in the patent above cited, are avoided.

Another way in which this result can be accomplished is illustrated in Figs. 4, 5, and 6. In this case, a tubular fabric 14, preferably of wire, but which may be made of fibrous material if desired, is placed around two spaced reinforcing members 15, as shown in Fig. 5. The tubular strip with the contained reinforcing members may be incorporated into the filler in this form if desired, but it is preferred to close the portion of the fabric between the reinforcing members upon itself, as shown in Figs. 4 and 6. This effectively spaces the reinforcing members apart, and greatly facilitates the handling of the reinforcement prior to its incorporation in the filler.

The filler 11 may be made of a comparatively hard rubber or of a compound of fabric and rubber, or it may be made to approximate the flexibility of the remainder of the tire, so that the top or outer portion of the filler, represented by 16, may bend with the side walls of the tire. If this latter result is desired, it is preferred to locate the reinforcement quite near the base of the bead filler, as is shown by the drawings.

While enlargements 13 and 15 have been shown as composed of a plurality of strands, forming a cable, these may be made of single strands of wire as shown in Fig. 7, or, if desired, of fibrous or other material; and the word reinforcing member, as used in the appended claims, is to be construed as meaning either a single cord or wire or a cable formed of a plurality of cords or wires. The exact structure shown may be modified without departing from the spirit of my invention as defined in the appended claims.

I claim—

1. In a tire casing, a reinforcement for the bead thereof comprising a strip of fabric disposed circumferentially of the bead and being substantially straight in a direction transverse to the bead, said fabric having its edge portions strengthened throughout the circumference of the bead.

2. In a tire casing, a reinforcement for the bead thereof comprising a strip of woven wire disposed circumferentially of the bead and being substantially straight in a direction transverse to the bead, said strip having its edge portions strengthened throughout the circumference of the bead.

3. In a tire casing, a reinforcement for the bead thereof comprising a strip of fabric disposed circumferentially of the bead and having its edge portions strengthened throughout the circumference of the bead by the inclusion of additional reinforcing members.

4. In a tire casing, a reinforcement for the bead thereof comprising a strip of woven wire disposed circumferentially of the bead and having its edge portions strengthened throughout the circumference of the bead by the inclusion of additional wires.

5. In a tire casing, a reinforcement for the bead thereof comprising a pair of reinforcing members disposed circumferentially of the bead, and a tubular fabric inclosing such members.

6. In a tire casing, a reinforcement for the bead thereof comprising a pair of reinforcing members disposed circumferentially of the bead and a tubular fabric inclosing such members and being closed upon itself intermediate the members.

7. A filler for the bead of a tire casing comprising a body portion, and a reinforcement embedded therein consisting of a circumferentially disposed strip of fabric substantially straight in a direction transverse to the bead and having its edge portions strengthened throughout its circumference.

8. A filler for the bead of a tire casing comprising a body portion, and a reinforcement embedded therein consisting of a circumferentially disposed strip of woven wire substantially straight in a direction transverse to the bead and having its edge portions strengthened throughout its circumference.

9. A filler for the bead of a tire casing comprising a body portion, and a reinforcement embedded therein consisting of a strip of fabric disposed circumferentially of the bead and having its edge portions strengthened throughout the circumference of the bead by the inclusion of additional reinforcing members.

10. A filler for the bead portion of a tire casing comprising a body portion, and a reinforcement embedded therein consisting of a strip of woven wire disposed circumferentially of the bead and having its edge portions strengthened throughout the circumference of the bead by the inclusion of additional wires.

11. A filler for the bead of a tire casing comprising a body portion and a reinforcement embedded therein consisting of a pair of reinforcing members and a tubular fabric inclosing such members.

12. A filler for the bead of a tire casing, comprising a body portion; and a reinforcement embedded therein, consisting of a pair of reinforcing members, and a tubular fabric inclosing such members and being closed upon itself intermediate the members.

MELVON A. MARQUETTE.